United States Patent [19]

Huhn et al.

[11] Patent Number: 4,559,385
[45] Date of Patent: Dec. 17, 1985

[54] METHOD FOR PREPARING AQUEOUS EMULSIONS

[75] Inventors: Karl Huhn; Kurt Ullrich, both of Burghausen, Fed. Rep. of Germany

[73] Assignee: Wacker-Chemie GmbH, Munich, Fed. Rep. of Germany

[21] Appl. No.: 648,416

[22] Filed: Sep. 10, 1984

[30] Foreign Application Priority Data

Dec. 1, 1983 [DE] Fed. Rep. of Germany ....... 3343575

[51] Int. Cl.$^4$ ............................................. C08L 83/00
[52] U.S. Cl. .................................... 524/838; 524/864; 524/588; 528/17; 528/18; 528/38; 427/387; 428/447
[58] Field of Search ...................... 524/838, 864, 588; 528/17, 18, 38

[56] References Cited

U.S. PATENT DOCUMENTS 3,836,371 9/1974 Kokoszka .............................. 528/38
3,876,459 4/1975 Burrill .................................. 528/10

Primary Examiner—Melvyn I. Marquis

[57] ABSTRACT

Aqueous emulsions for impregnating organic fibers, comprising, in addition to water and dispersants, (1) a diorganopolysiloxane having a Si-bonded hydroxyl group in each terminal unit and whose organic radicals are free of basic nitrogen atoms; (2) an organopolysiloxane containing diorganosiloxane units in which the two organic radicals are monovalent hydrocarbon radicals and also contains at least two monovalent SiC-bonded organic radicals per molecule having a basic nitrogen atom in which the organopolysiloxane is present in the emulsion in an amount of from 5 to 50 weight percent based on the weight of the diorganopolysiloxane (1); (3) an organosilicon compound selected from an organosilane containing at least two SiOC-bonded monovalent organic radicals consisting of carbon, hydrogen and possibly oxygen and/or partial hydrolyzates thereof, in which the organosilicon compound is present in the emulsion in an amount of from 2 to 6 weight percent based on the total weight of the diorganopolysiloxane (1) and organopolysiloxane (2); and (4) a condensation catalyst, which is present in an amount of from 0.2 to 1 weight percent based on the total weight of the diorganopolysiloxane (1) and organopolysiloxane (2).

These aqueous emulsions are prepared by mixing the organosilicon compound (3) with an emulsion of diorganopolysiloxane (1) and organopolysiloxane (2) and thereafter mixing the resultant mixture with the condensation catalyst (4).

3 Claims, No Drawings

METHOD FOR PREPARING AQUEOUS EMULSIONS

The present invention relates to aqueous emulsions and more particularly to a method for preparing aqueous emulsions having better stability.

BACKGROUND OF THE INVENTION

Aqueous emulsions of organopolysiloxanes have been applied to organic fibers to improve their resistance to shrinkage and to impart a durable soft handle. U.S. Pat. No. 3,876,459 to Burrill, for example, discloses treating wool with an aqueous emulsion containing (A) a diorganopolysiloxane having a Si-bonded hydroxyl group in each terminal unit and whose organic radicals are free of basic nitrogen; (B) an organosilane containing an organic radical which contains a basic nitrogen atom or a partial hydrolyzate of such organosilane or the reaction product of component (A) with such organosilane or partial hydrolyzate thereof; and possibly (C) a silane containing 3 or 4 SiOC-bonded alkyl or alkoxyalkylene radicals as well as; (D) a condensation catalyst. Koerner et al, however, disclose in U.S. Pat. No. 4,137,179 that such emulsions are unstable.

Therefore, it is an object of the present invention to provide stable aqueous emulsions. Another object of the present invention is to provide stable aqueous emulsions which may be applied to fibers. Still another object of the present invention is to provide stable aqueous emulsions which impart a pleasant hand and high resilience to fibers. A further object of the present invention is to provide treated fibers which will have a pleasant hand and high resilience after repeated cleanings in water or organic solvents. A still further object of the present invention is to provide a method for preparing stable aqueous emulsions which may be applied to fibers.

SUMMARY OF THE INVENTION

The foregoing objects and others which will become apparent from the following description are accomplished in accordance with this invention, generally speaking, by providing a method for preparing aqueous emulsions for impregnating organic fibers which comprises mixing (1) a diorganopolysiloxane containing a Si-bonded hydroxyl group in each terminal unit and whose organic radicals are free of basic nitrogen atoms; and (2) an organopolysiloxane which contains diorganosiloxane units in which the organic radicals are monovalent hydrocarbon radicals and at least two monovalent SiC-bonded organic radicals per molecule which contain a basic nitrogen atom with water and dispersant to form an aqueous emulsion; mixing (3) an organosilicon compound selected from an organosilane containing at least two SiOC-bonded monovalent organic radicals consisting of carbon, hydrogen and possibly oxygen and/or a partial hydrolyzate of such a silane with the aqueous emulsion and then adding to the resultant emulsion, (4) a condensation catalyst, in which component (2) is present in the emulsion in an amount of from 5 to 50 weight percent based on the weight of component (1); component (3) is present in the emulsion in an amount of from 2 to 6 weight percent based on the total weight of components (1) and (2) and component (4) is present in the emulsion in an amount of from 0.2 to 1 weight percent based on the total weight of components (1) and (2).

DESCRIPTION OF THE INVENTION

Diorganopolysiloxanes (1) containing a Si-bonded hydroxyl group in each terminal unit and whose organic radicals are free of basic nitrogen atoms which have been or could have been used heretofore in the preparation of aqueous emulsions for impregnating organic or inorganic fibers may be used in the method of this invention. The preferred diorganopolysiloxanes are those represented by the following general formula:

$HOSiR_2O(SiR_2O)_nH$, where R represents the same or different monovalent hydrocarbon radicals and n is an integer having a value such that the average viscosity of these diorganopolysiloxanes (1) is from 500 to 50,000 mPa.s at 25° C. The hydrocarbon radicals represented by R preferably have from 1 to 20 carbon atoms per radical. Examples of hydrocarbon radicals which can be present in the diorganosiloxane units of diorganopolysiloxane (1) are alkyl radicals such as methyl, ethyl, n-propyl and isopropyl as well as butyl, octyl, tetradecyl and octadecyl radicals; aliphatic radicals which contain aliphatic multiple bonds such as vinyl, allyl and hexenyl radicals; cycloaliphatic hydrocarbon radicals such as cyclopentyl and cyclohexyl radicals; aromatic hydrocarbon radicals such as the phenyl and naphthyl radicals; alkaryl radicals such as the tolyl radical and aralkyl radicals such as the benzyl radical. It is preferred that at least 80 percent of the number of hydrocarbon radicals in the diorganopolysiloxane (1) be methyl radicals because of their availability.

Although only one type of diorganopolysiloxane (1) need be used, it is however possible to use a mixture of at least two different types of diorganopolysiloxanes (1).

The diorganopolysiloxane (1) can be prepared either by a polymerization which takes place at least essentially in the absence of water or it can be prepared by a polymerization in an aqueous emulsion.

The viscosity of diorganopolysiloxane (1) preferably ranges from about 2000 to 10,000 mPa.s at 25° C.

Organopolysiloxane (2) contains at least two monovalent SiC-bonded organic radicals per molecule having a basic nitrogen atom and diorganosiloxane units, in which the two organic radicals are hydrocarbon radicals. The diorganosiloxane units, in which the two organic radicals are hydrocarbon radicals, may be represented by the general formula:

$R_2SiO$ where R is the same as above. The examples of hydrocarbon radicals which may be present in diorganopolysiloxane (1) also applies equally to examples of hydrocarbon radicals which may be present in organopolysiloxane (2).

The siloxane units which contain SiC-bonded organic radicals having a basic nitrogen atom which are present in organopolysiloxane (2), preferably have the following general formula:

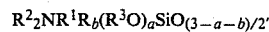
$R^2{}_2NR^1R_b(R^3O)_aSiO_{(3-a-b)/2}$, where R is the same as above; $R^1$ represents a divalent hydrocarbon radical; $R^2$ is hydrogen or the same or different alkyl or aminoalkyl radical; $R^3$ is the same or different alkyl radical having from 1 to 4 carbon atoms;

a is 0, 1 or 2; b is 0, 1 or 2 and the sum of a+b is at most 2.

Examples of divalent hydrocarbon radicals represented by $R^1$ are methylene, ethylene, propylene, butylene, cyclohexylene, octadecylene, phenylene and butenylene. The n-butylene radical is preferred due to its availability.

The examples of the alkyl radicals represented by R also apply equally to the alkyl radicals represented by $R^2$.

Examples of aminoalkyl radicals represented by $R^2$ are those having the following formulas:

$H_2N(CH_2)_3-$
$H_2N(CH_2)_2NH(CH_2)_3-$
$H_2N(CH_2)_2-$
$(H_3C)_2N(CH_2)_2-$
$H_2N(CH_2)_5-$
$H(NHCH_2CH_2)_3-$ and
$C_4H_9NHCH_2CH_2NHCH_2CH_2-$.

Preferably at least one $R^2$ is hydrogen.

Examples of alkyl radicals represented by $R^3$ are in particular methyl, ethyl and ispropyl radicals.

The organopolysiloxanes (2) used in the method of this invention preferably have a viscosity of from 20 to 20,000 mPa.s at 25° C.

One type of organopolysiloxane (2) can be used; however, it is also possible to use a mixture of at least two different types of organopolysiloxanes (2).

Organosilicon compounds (3) which contain at least two SiOC-bonded monovalent organic radicals consisting of carbon, hydrogen and possible oxygen preferably have the following general formula:

$$R^4{}_a Si[(OCH_2CR^5H)_m OX]_{4-a},$$

where $R^4$ represents an alkyl radical substituted by at least one amino or imino group, such as the examples described above for aminoalkyl radicals $R^2$ or $R^4$ is the same as R; $R^5$ is hydrogen or an alkyl radical having from 1 to 4 carbon atoms; X is hydrogen or an alkyl radical having from 1 to 4 carbon atcms or an acyl radical having from 1 to 5 carbon atoms, preferably three carbon atoms or less; a is 0, 1 or 2 and m is 0 or an integer having a value of 1 to 30, provided that m is at least 1 when X is hydrogen or an acyl radical.

Examples of organosilicon compounds are organosilanes or partial hydrolyzates thereof, such as methyltrimethoxysilane, methyltriethoxysilane, the ethoxypolysiloxane, often referred to as "ethylsilicate 40" and which contains 40 weight percent $SiO_2$ and silanes having the following formulas:

$H_2N(CH_2)_2HN(CH_2)_3Si(OCH_3)_3$
$CH_3Si(OCH_2CH_2OCH_3)_3$
$CH_3O(CH_2CH_2O)_6(CH_2)_3Si(OCH_3)_3$
$H_2N(CH_2)_2NH(CH_2)_3Si(OCH_3)_2$.

One type of organosilicon compound (3) can be used; however, it is also possible to use a mixture of at least two different types of such a silanes or partial hydrolyzates thereof.

Any catalyst which has has been or could have been used heretofore in the condensation of Si-bonded condensable groups can be used as the condensation catalyst (4) in this invention. Examples of such catalysts are in particular the tin or zinc salts of carboxylic acids in which the hydrocarbon radicals can be bonded directly to the tin atom. Specific examples of such tin compounds are di-n-butyltin dilaurate, tin octoates, di-2-ethylhexyltin dilaurate, di-n-butyltin di-2-ethylhexoate, di-2-ethylhexyltin di-2-ethylhexoate and zinc octoates. Other examples of condensation catalysts (4) are alkoxy titanates such as butyl titanates and triethanolamine titanates and zirconium compounds.

One type of catalyst (4) can be used or a mixture of at least two different types of condensation catalysts (4), may be employed in this invention. An example of a mixture of condensation catalysts which may be employed are di-n-butyltin dilaurate and triethanolamine titanate.

The relative proportions of the components employed in the aqueous emulsions are critical in order to obtain a stable emulsion. The organopolysiloxane (2) having a basic nitrogen atom per molecule should be present in the emulsion in an amount of from 5 to 50 weight percent based on the weight of the diorganopolysiloxane (1) and the amount of organosilicon compound (3) ranges from 2 to 6 weight percent based on the total weight of diorganopolysiloxane (1) and organopolysiloxane (2). The condensation catalyst (4) is present in the emulsion in an amount of from 0.2 to 1 percent based on the total weight of diorganopolysiloxane (1) and organopolysiloxane (2).

When the organopolysiloxane (2), organosilicon compound (3) and condensation catalyst (4) are employed in the emulsions in amounts below the limits prescribed above, fibers impregnated with these emulsions do not have as pleasant a hand or as high a resilience as fibers impregnated with emulsions containing organopolysiloxane (2), organosilicon compound (3) and condensation catalyst (4) within the prescribed limits; even though these properties are retained by the fibers after repeated cleaning with water or organic solvent. When organosilicon compound (3) and condensation catalyst (4) are employed in the emulsions in an amount which exceeds the limits described above, the resultant emulsions are unstable. In addition, the use of more than 50 weight percent of organopolysiloxane (2), based on the weight of diorganopolysiloxane (1) is uneconomical since no additional advantages are obtained over those obtained using lower amounts.

Any dispersant which has been used or could have been used heretofore to produce aqueous emulsions of organopolysiloxanes for impregnating organic fibers may be used as dispersants in this invention.

Preferred dispersants are nonionic emulsifiers such as the polyglycol ethers of alkanols or phenol or alkylphenols such as nonylphenol polyglycol ethers, tert-butylphenol polyglycol ethers, polyoxyethylene sorbitan hexastearate, polyoxyethylene isotridecyl ethers and trimethylnonylethers of polyethylene glycol which contain 6 to 14 ethylene oxide units per molecule; polyoxyethylene sorbitan oleate having a saponification number of 102 to 108 and a hydroxyl number of 25 to 35 and dimethylpolysiloxane-ethylene oxide block copolymers.

Other examples of dispersants which can be used in the method of this invention are anionic emulsifiers such as alkylbenzenesulfonates and sodium alkylarylpolyethyleneglycol sulfonates.

Other examples of dispersants which can be used in the method of this invention are cationic emulsifiers such as tetraalkylammonium chlorides.

The dispersants are preferably used in an amount of from 3 to 20 weight percent and more preferably from 5 to 10 weight percent, based on the total weight of diorganopolysiloxanes (1), organopolysiloxane (2), or- A polyester knit is immersed in an aqueous emulsion prepared by mixing 30 parts of the emulsion prepared in (d) above with 970 parts by volume of water. The polyester is squeezed out to a 100 percent liquid uptake and then heated at 150° C. for 10 minutes. The polyester thus obtained has a soft, pleasant and elastic hand which is still present even after 5 washings at 30° C. in a household washing machine or after treating five times for 20 minutes with perchloroethylene.

EXAMPLE 2

(a) About 30 parts of an 80 percent solution of zirconium octoate in white spirit (zirconium content: 18 percent) are first mixed with 3 parts of the tert-butylphenol polyglycol ether described in Example 1(c) above and 3 parts of water. An emulsion is prepared from the mixture thus obtained by the addition of 64 parts of water.

(b) About 85 parts of an emulsion prepared in accordance with Example 1(a) above are mixed with 10 parts of an emulsion prepared in accordance with Example 1(b) above. About 4 parts of a solution prepared by adding 40 parts of a silane having the following formula

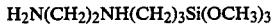

$H_2N(CH_2)_2NH(CH_2)_3Si(OCH_3)_3$ to 60 parts water are added to the aqueous emulsion.

About 1 part of the emulsion prepared in (a) above is mixed into the resultant mixture.

The emulsion thus obtained is stable even after storage for 6 months in a closed container at 40° C.

EXAMPLE 3

(a) The procedure described in Example 1(a) is repeated except that 35 parts of the product obtained from the reaction of a dimethylpolysiloxane having a Si-bonded hydroxyl group in each terminal unit and a viscosity of 100 mPa.s at 25° C. with a silane having the following formula

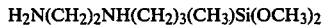

$H_2N(CH_2)_2NH(CH_2)_3(CH_3)Si(OCH_3)_2$ are substituted for the 35 parts of dimethylpolysiloxane having a Si-bonded hydroxyl group in each terminal unit. This reaction product has an amine number of 0.1 and a viscosity of 5000 mPa.s at 25° C.

(b) About 50 parts of the emulsion prepared in accordance with Example 1(a) above are mixed with 10 parts of the emulsion prepared in (a) above. About 4 parts of a solution prepared by adding 40 parts of a silane having the following formula

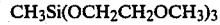

$CH_3Si(OCH_2CH_2OCH_3)_3$ to 60 parts water is added to the resultant aqueous emulsion.

About 1 part of the emulsion prepared in Example 2(a) above is mixed into the resultant mixture.

The emulsion thus obtained is stable even after storage for 6 months in a closed container at 40° C.

A 100 percent cotton fabric is immersed in an aqueous emulsion which is prepared by mixing 40 parts of an emulsion prepared in accordance with (b) above with 100 parts of a 45 percent aqueous solution of dimethyloldihydroxyethyleneurea, 20 parts of zinc nitrate and 860 parts of water. The fabric is then squeezed out to a 100 percent liquid uptake and finally heated at 150° C. for 10 minutes. The fabric treated in this manner has a soft, pleasant and elastic hand which is still present even after 5 washings at 30° C. in a household washing machine or after treating with perchloroethylene five times for 20 minutes as in chemical cleaning.

What is claimed is:

1. An aqueous emulsion for impregnating organic fibers comprising in addition to water and a dispersant: (1) a diorganopolysiloxane having a Si-bonded hydroxyl group in each terminal unit, in which the organic radicals of the diorganopolysiloxane are free of basic nitrogen atoms; (2) an organopolysiloxane containing diorganosiloxane units in which the organic radicals of the diorganosiloxane are monovalent hydrocarbon radicals, and at least two monovalent SiC-bonded organic radicals per molecule having a basic nitrogen atom, in which the organopolysiloxane (2) is present in the emulsion in an amount of from 5 to 50 weight percent based on the weight of diorganopolysiloxane (1); (3) an organosilicon compound selected from the group consisting of an organosilane containing at least two SiOC-bonded monovalent organic radicals containing carbon and hydrogen or carbon, hydrogen and oxygen, partial hydrolyzates of such organosilane and mixtures thereof, in which the organosilicon compound (3) is present in the emulsion in an amount of from 2 to 6 weight percent based on the total weight of the diorganopolysiloxane (1) and organopolysiloxane (2); and (4) a condensation catalyst, which is present in the emulsion in an amount of from 0.2 to 1 weight percent based on the toatal weight of the diorganopolysiloxane (1) and organosiloxane (2), in which the emulsion is prepared by mixing the organosilicon compound (3) with an aqueous emulsion containing diorganopolysiloxane (1) and organopolysiloxane (2) and thereafter mixing the resultant emulsion with the condensation catalyst.

2. The emulsion prepared by the method of claim 1, wherein the organosilicon compound (3) is mixed with water before it is mixed with an aqueous emulsion of diorganopolysiloxane (1) and organopolysiloxane (2).

3. The emulsion prepared by the method of claim 1, wherein the condensation catalyst (4) is mixed with water before it is mixed with an aqueous emulsion containing diorganopolysiloxane (1), organopolysiloxane (2) and organosilicon compound (3).

* * * * *